United States Patent Office 2,960,536
Patented Nov. 15, 1960

2,960,536
PROCESS FOR THE PRODUCTION OF NITROSAMINES

John W. Getz, St. Albans, W. Va., assignor to Food Machinery and Chemical Corporation, New York, N.Y., a corporation of Delaware No Drawing. Filed Apr. 11, 1957, Ser. No. 652,100

4 Claims. (Cl. 260—583)

This invention relates to an improved process for the production of nitrosamines from secondary amines.

The nitrosamines prepared by this process are those having the formula

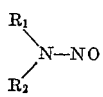

where $R_1$ and $R_2$ are alkyl radicals and may be the same or different.

The term "alkyl" as used herein includes radicals of the cycloaliphatic series as well as those of the straight chain aliphatic series.

In the prior art nitrosamines have been prepared by several methods, including reaction of a salt of a secondary amine with sodium nitrite in a solution of carefully controlled acidity. The present invention is an improvement in this general method of preparation.

The prior art process is exemplified by the procedure given in Organic Syntheses, Collective Volume 2 (1943) for the preparation of nitrosodimethylamine. This procedure calls for adding a small quantity of hydrochloric acid to an aqueous solution of dimethylamine hydrochloride and then slowly adding a solution of sodium nitrite while frequently checking the acidity of the reaction mixture and adjusting it by small additions of hydrochloric acid so that it is maintained barely acid to litmus. The latter condition corresponds to a pH of approximately 6.0. The temperature is maintained at 70°–75° C., and stirring is continued for two hours after all the sodium nitrite has been added.

It is an object of this invention to provide a simplified and improved procedure for the production of nitrosamines from amines and soluble nitrites.

It is another object of this invention to provide a process suitable for large-scale commercial operation by which nitrosamines can be prepared at a high production rate and high raw material efficiency.

In the procedure given in Organic Syntheses the sodium nitrite is added gradually and the acidity of the solution must be checked repeatedly. This process is not satisfactory for a commercial operation because of the long time required to add the sodium nitrite, the necessity for further heating to complete the reaction, and the required control of the pH.

In an alternative procedure which has been proposed, a sodium nitrite solution is added to a solution of dialkylamine, and sulfuric acid is then added until the pH is in the range of about 5 to about 2. Approximately one equivalent of acid per mole of amine is required. The process is an improvement over that described in Organic Syntheses, but the sulfuric acid must be added over a considerable period of time and with good agitation to prevent formation of nitrogen oxides, which would escape from the vent, causing pollution of the atmosphere and loss of material. Even with good agitation, there is considerable evolution of nitrogen oxides resulting from localized acid conditions.

It has now been found that nitrosamines can be prepared in a shorter time and with greater raw material efficiency by adding a soluble nitrite, preferably in solid form, to a neutral or slightly alkaline solution of amine and then adding an acid to lower the pH of the solution to within the range of from about 5 to about 2. By adding the nitrite to a neutral or alkaline solution of the amine, there is no opportunity during the addition for the formation of nitrogen oxides, which are formed only in an acid solution. By having the amine solution neutral or only slightly alkaline at the time the nitrite is added, the subsequent addition of only a small amount of acid is sufficient to give the desired acidity, and thus there is little opportunity for evolution of nitrogen oxides during this stage. Also, this procedure minimizes the time required to add the reagents and reduces the quantity of water needed, so that a larger batch of the nitrosamine can be prepared in given equipment in a shorter time.

In carrying out the process a neutral amine salt, such as the sulfate or hydrochloride, may be charged to the reactor. Or, the free amine may be charged and then an acid, such as sulfuric or hydrochloric, added until most or all of the amine is neutralized, taking care that the final pH is above 6 and preferably at least 7. If it is desired to use an amine salt but to have the solution distinctly alkaline, a small amount of an alkali metal hydroxide or other alkaline material may be added to the amine salt solution.

After the main quantity of sodium or other nitrite has been added and the pH has been brought within the range of about 5 to about 2, a small additional quantity of nitrite may be added, if desired, to insure that sufficient nitrite is present to react with all the amine. Since the nitrite is less expensive than the amine, it is economical to have a stoichiometric excess, rather than a deficiency, of nitrite.

It is important that the pH of the final solution be in the range of approximately 5 to approximately 2. At higher pH the reaction of the nitrite with the amine to form the nitrosoamine does not proceed at a satisfactory rate. At pH below 2, hydrolysis of the nitroso compound to re-form the original amine proceeds at an appreciable rate.

Any soluble inorganic nitrite may be used in this process. Sodium nitrite is usually preferred in the commercial process because of its cheapness and ready availability. It is desirable that the cation of the nitrite form a soluble salt with the acid used to combine with the free amine, to avoid the formation of solids in the reactor. Thus, if the amine sulfate is charged to the reactor, the use of calcium nitrite would normally be avoided, since it would result in the formation of insoluble calcium sulfate.

The temperature at which the process is carried out is not critical and may vary over a wide range. Temperatures as low as 0° C. may be used. If temperatures above 100° C. are used, special precautions to prevent loss of amine vapors may be necessary. The preferred range is from 40° to 100° C.

The process is further illustrated by the following examples. Example 1 illustrates the process as applied to the production of nitrosodimethylamine, using the free amine as the initial charge. Example 2 illustrates a similar process in which the initial charge consists of the amine salt containing enough free amine to render the solution alkaline. Example 3 illustrates the low yield and productivity obtained with another procedure, not within the scope of the present procedure, when applied to large scale production. Examples 4–7 illustrate the application of the process to the preparation of various nitrosodialkylamines.

EXAMPLE 1

To a 4000-gallon stainless steel reactor equipped with agitator and external cooler were added 835 gallons of cold water and 1725 gallons of 40% dimethylamine (115 pound moles). After this, 6850 pounds of 60° Bé. sulfuric acid was added at such a rate as to keep the vapor temperature below 40° C. for the first 2000 pounds and below 50° C. for the remainder. The heat of reaction was removed with the external cooler. The pH after this addition was above 9.5 as determined by thymolphthalein indicator (blue). Next, 8000 pounds of solid sodium nitrite was added. The second acid addition, amounting to approximately 765 pounds (60° Bé.), was added at low rates until the nitrosation reaction started. This was indicated by a sudden rise in temperature. This acid addition required approximately one-half hour. After the reaction had subsided, as indicated by a drop in temperature, the acidity of the solution was adjusted to a pH of approximately 4. The temperature during the reaction varied from approximately 50° C. to approximately 80° C. To insure completeness of the reaction, 500 pounds additional sodium nitrite was added as 40% solution. Distillation of the crude product gave a yield of nitrosodimethylamine corresponding to 94% of the theoretical, based on the dimethylamine charged. The average rate of production was 1000 pounds per hour.

EXAMPLE 2

To the same 4000-gallon reactor described in Example 1 was added 26,756 pounds of an aqueous 38% dimethylamine sulfate solution containing 270 pounds of free dimethylamine. The total dimethylamine content was 115 pound moles. The solution was distinctly alkaline. Solid sodium nitrite in the amount of 8000 pounds was added. From this point on the procedure was similar to that in Example 1. The yield of nitrosodimethylamine was 94% of theoretical. The overall batch time is substantially reduced by charging to the reactor, in place of the free amine used in Example 1, a solution of amine salt containing a minor proportion of free amine.

EXAMPLE 3

To a 4000-gallon agitated stainless steel reactor equipped with agitator and external cooler was added 760 gallons of water, 7500 pounds solid sodium nitrite and 1660 gallons of 40% dimethylamine (110 pound moles). Sulfuric acid was added slowly over a 8–10 hour period till the nitrosation reaction started, as indicated by a sudden rise in the reactor temperature. During most of this addition, dark brown nitrogen oxide fumes were vented. About 8230 pounds of 78% acid was required. The temperature was kept below 40° C. till the end when the vigorous reaction caused a rise to 70–75° C. The pH at the end of the addition was approximately 4. The yield was 80% of theoretical and the average rate of production was 500 pounds per hour.

EXAMPLE 4

Preparation of N-nitroso N-n-butyl ethanolamine

A mixture of 117 grams (1 mole) of N-n-butyl ethanolamine and 175 grams of water was neutralized with approximately 95 grams (1 mole) of concentrated (37%) hydrochloric acid. To the resulting substantially neutral solution was added 86.3 grams of sodium nitrite (1.25 moles) as a 40% solution in water. The resultant mixture had a pH of 7.5, and there was no evidence of reaction to form the nitroso compound. The pH was then adjusted to approximately 5 by the addition of concentrated hydrochloric acid with good agitation at a temperature of 40° to 50° C. Immediate reaction was evidenced by the rapid rise in temperature to about 70° C. and a separation of the nitroso product as an oily layer. The product was separated in a separatory funnel and dried over sodium sulfate, and weighed 150.5 grams, equivalent to a 96.4% yield. Subsequent vacuum rectification of the product yielded 129 grams of pure product boiling at 131–133° C. at 2.8 mm.

EXAMPLE 5

Nitrosation of long-chain dialkylamine

In this experiment the secondary amine was a commercial product known as Armeen-2C, consisting of a mixture of secondary aliphatic amines in which the alkyl radicals contain from 8 to 18 carbon atoms, with an average molecular weight of 383 to 450. A mixture of 84.2 grams of the amine in 80 milliliters of isopropanol was neutralized with 9.8 grams of concentrated sulfuric acid diluted with 10 milliliters of water. Then 34 milliliters of a 40% solution of sodium nitrite (approximately 15% excess) was added at a temperature of 30° C. No evidence of reaction was noted. The pH measured 7. The pH was then adjusted to 4 by the addition of 2.6 grams of concentrated sulfuric acid diluted with 5 milliliters of water and the reaction mixture heated to 70° C. for 1.5 hours. The product then separated into three layers, an aqueous layer, an alcohol layer, and a product layer. The product was separated in a separatory funnel and the residual alcohol in the product layer was removed under vacuum. Product weighed 103.3 grams.

EXAMPLE 6

Preparation of N-nitroso dicyclohexylamine

A mixture of 181 grams of dicyclohexylamine in 1200 milliliters of water was neutralized with 95 grams of concentrated hydrochloric acid. The hydrochloride was insoluble but the slurry was well agitated and 75 grams of sodium nitrite was added as a 40% solution. No evidence of nitrosamine formation was noted even on heating to 100° C. for two hours. The solid remained white in color. Adjustment of the pH to 2 with concentrated hydrochloric acid caused the reaction to begin, but it appeared to be proceeding slowly even at 100° C. The reaction was accelerated by the addition of 150 milliliters of butyl alcohol which caused the immediate conversion of the solid phase of the slurry to a light yellow oily liquid which rose to the top and was separated as a granular solid after cooling to room temperature with good agitation. The solid product melted at 104–106° C. after washing well with water and drying in a vacuum oven at 70° C. The product weighed 200 grams, equivalent to a yield of 95%.

EXAMPLE 7

N-nitroso diethanolamine (N-nitroso 2,2 iminodiethanol)

A solution of 105 grams (1 mole) of diethanolamine in 160 grams of water was neutralized with 95 grams (1 mole) of concentrated hydrochloric acid. Then 86 grams of sodium nitrite (1.25 moles) was added as a 40% solution in water. No evidence of reaction was noted even on warming to 90° C. The pH was then adjusted to 5 with concentrated hydrochloric acid with a resultant immediate reaction evidenced by a sharp rise in temperature and ebullition of the reaction mixture. The reaction mixture was maintained at about 100° C. for 30 minutes and then cooled to 4° C. in an ice bath. No separation of the product was noted but the solution had the yellow color characteristic of N-nitroso compounds. The product was recovered by salting it out with potassium carbonate. The yield was 60% of theory.

The nitrosamines prepared by the process of this invention are useful as solvents, plasticizers, antioxidants, special fuels and the like. For example, U.S. Patent No. 2,636,006 states that nitroso compounds, including nitrosodimethylamine, nitrosodiethylamine, and nitrosopiperidine, are useful as stabilizers for halogenated aromatic compounds. U.S. Patent No. 2,697,698 discloses that nitrosamines, including many aliphatic nitrosamines, are useful as solvents for acrylonitrile polymers.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for the preparation of a nitroso dialkylamine which comprises forming an aqueous solution containing a mixture of free dialkylamine and dialkylamine salt selected from the group consisting of sulfuric and hydrochloric acid salts, said solution having a pH of at least 7 and containing not more than one-tenth mole of free dialkylamine per mole of total amine; adding approximately one mole of solid alkali metal nitrite per mole of total dialkylamine; and then adding an acid selected from the group consisting of sulfuric and hydrochloric in sufficient quantity to lower the pH to within the range of approximately 5 to approximately 2.

2. The process of claim 1 in which the amine is dimethylamine.

3. The process of claim 1 in which the nitrite is sodium nitrite.

4. The process of claim 1 in which the mineral acid is sulfuric acid.

References Cited in the file of this patent

UNITED STATES PATENTS

| | | |
|---|---|---|
| 1,643,428 | Tesche et al. | Sept. 27, 1927 |
| 2,419,718 | Kehe | Apr. 29, 1947 |

OTHER REFERENCES

Sidgwick: "Organic Chemistry of Nitrogen," Oxford University Press, pages 451–453 (1937).

Blatt: "Organic Syntheses," Collective Vol. II, pages 211–13 (1943).